(12) United States Patent
Tatsuhara et al.

(10) Patent No.: US 7,267,710 B2
(45) Date of Patent: Sep. 11, 2007

(54) METHOD OF AND APPARATUS FOR REGENERATING ADSORBENT

(75) Inventors: Kiyoshi Tatsuhara, Nagasaki (JP);
Akinori Yasutake, Nagasaki (JP);
Takashi Kurisaki, Nagasaki (JP);
Norihisa Kobayashi, Tokyo (JP);
Tomoaki Sugiyama, Nagasaki (JP);
Masahiko Nagai, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 300 days.

(21) Appl. No.: 10/799,781

(22) Filed: Mar. 15, 2004

(65) Prior Publication Data

US 2004/0187685 A1    Sep. 30, 2004

(30) Foreign Application Priority Data

Mar. 28, 2003  (JP) ............................. 2003-092746
Jul. 16, 2003   (JP) ............................. 2003-198122

(51) Int. Cl.
   *B01D 53/02*   (2006.01)
(52) U.S. Cl. ..................... 95/133; 95/134; 95/148; 96/143
(58) Field of Classification Search .............. 95/131, 95/133, 134, 148; 205/687, 768; 96/143
See application file for complete search history.

(56) References Cited

U.S. PATENT DOCUMENTS

| 3,730,885 | A |   | 5/1973 | Makrides et al. |   |
|---|---|---|---|---|---|
| 4,217,191 | A |   | 8/1980 | Doniat et al. |   |
| 4,280,886 | A |   | 7/1981 | Sawa et al. |   |
| 5,904,832 | A | * | 5/1999 | Clifford et al. | 205/756 |
| 6,391,185 | B1 | * | 5/2002 | Shvarev et al. | 205/687 |
| 2004/0020790 | A1 | * | 2/2004 | Waite et al. | 205/710 |

FOREIGN PATENT DOCUMENTS

| JP | 11-347364 | 12/1999 |
|---|---|---|
| JP | 2000-167395 | 6/2000 |
| JP | 2000-325495 | 11/2000 |
| JP | 3272366 | 1/2002 |

* cited by examiner

*Primary Examiner*—Robert A. Hopkins
(74) *Attorney, Agent, or Firm*—Wenderoth, Lind & Ponack, L.L.P.

(57) ABSTRACT

An apparatus for regenerating an adsorbent includes an electrolytic cell filled with an electrolyte and an electrode unit that includes a first electrode made from the adsorbent in which a substance is adsorbed and a second electrode. The first electrode and the second electrode are soaked in the electrolyte. The apparatus also includes a power source that supplies a voltage applied between the first electrode and the second electrode.

4 Claims, 13 Drawing Sheets

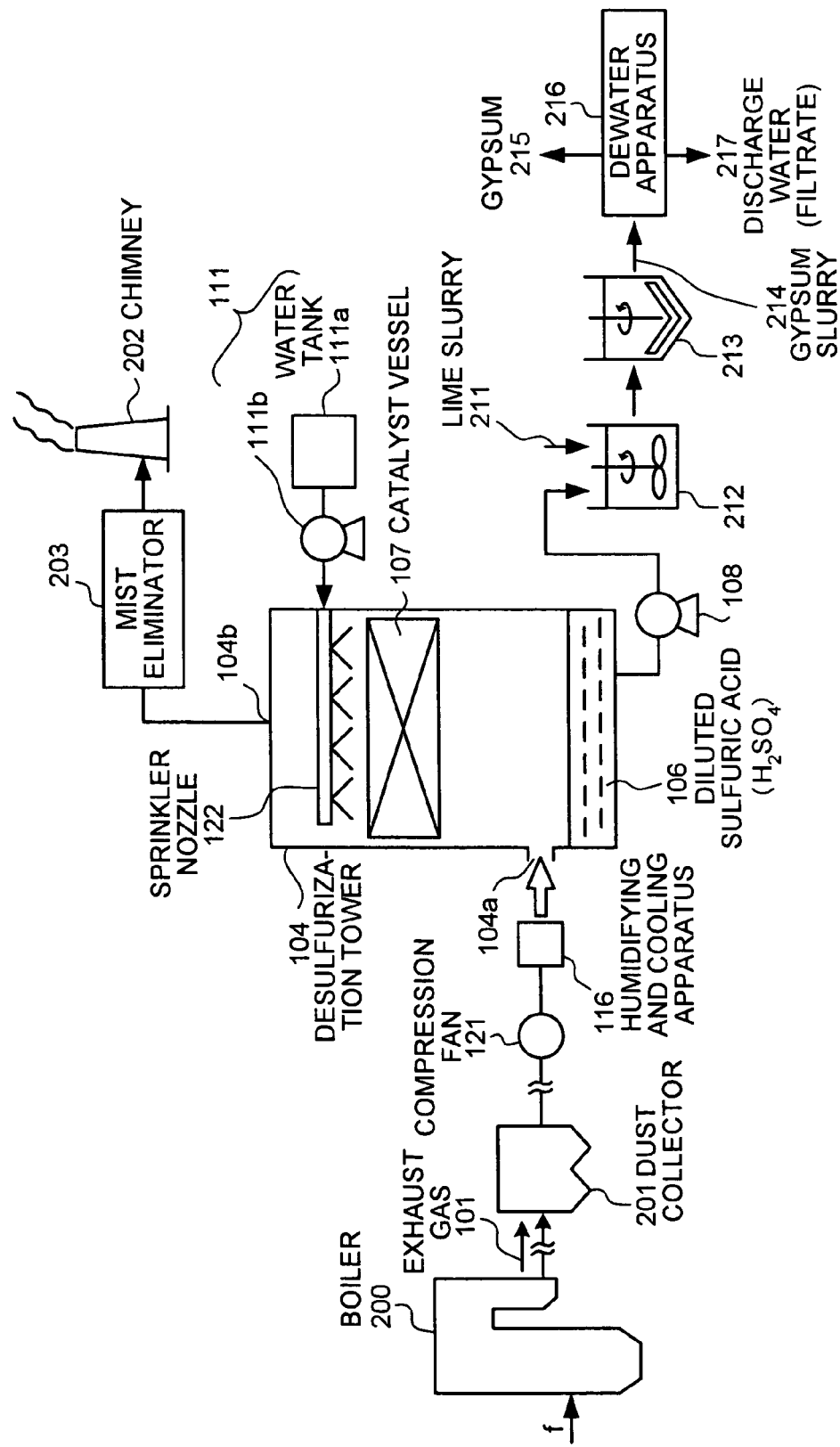

US 7,267,710 B2

METHOD OF AND APPARATUS FOR REGENERATING ADSORBENT

BACKGROUND OF THE INVENTION

1) Field of the Invention

The present invention relates to a method of and apparatus for regenerating a used adsorbent for exhaust gas treatment.

2) Description of the Related Art

To remove substances such as impurities, odor substances, staining substances, and harmful substances from a gaseous phase or liquid phase, and to separate a gas from a liquid, activated charcoal has hitherto been used.

Recently, to produce higher-grade chemical products and deal with environmental issues, low pollution, hygienic control and health issues, it has been desired to develop high-quality filters and adsorbents in these fields. With this tendency, a porous structural body having excellent adsorption and desorption performance has been required.

As the porous structural body, conventional carbon materials, such as activated charcoal and activated carbon fiber, may be mentioned. When activated charcoal is used as the adsorbent to treat exhaust gas released from a boiler and so forth, the activity of the activated charcoal decreases because heavy metals such as mercury (Hg) and selenium (Se) are adsorbed thereto.

When the carbon material is not reused, it may be combusted. However, since mercury is vaporized and scattered during the combustion, a filter must be used to adsorb mercury again.

To regenerate an adsorbent such as activated charcoal, a method for heating it at high temperature in an inert gas has been suggested (see Japanese Patent Application Laid-Open No. 2000-167395).

However, this method has a problem: it requires large-scale heating equipment. In addition, an exhaust-gas treatment apparatus such as a boiler is large-scale equipment. Accordingly, recycling of a used adsorbent is important for reducing the cost in continuous operation and thus a simple treatment method has been strongly desired.

In the metals adsorbed by activated charcoal, valuable metals such as Zr and Pd are sometimes included in addition to harmful metals. It is desired that these valuable metals are recycled for effective utilization of resources.

Moreover, when a valuable-metal containing material is processed, a wiping waste cloth used during the processing may contain the valuable metal and an ion exchange resin and chelate resin used in the processing may adsorb the metal. Therefore, a method of efficiently recovering such a metal from the waste cloth and resins has been desired.

SUMMARY OF THE INVENTION

It is an object of the present invention to at least solve the problems in the conventional technology.

A method of regenerating an adsorbent according to one aspect of the present invention includes applying a voltage between a first electrode made from the adsorbent in which a substance is adsorbed and a second electrode, to elute the substance from the first electrode in an ionic state, in an electrolyte.

An apparatus for regenerating an adsorbent according to one aspect of the present invention includes an electrolytic cell filled with an electrolyte; an electrode unit that includes a first electrode made from the adsorbent in which a substance is adsorbed and a second electrode, the first electrode and the second electrode being soaked in the electrolyte; and a power source that supplies a voltage applied between the first electrode and the second electrode.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 13 is a schematic diagram of an exhaust gas treatment system according to an embodiment of the present invention;

DETAILED DESCRIPTION

Exemplary embodiments of a method of and an apparatus for regenerating an adsorbent relating to the present invention will be explained in detail below with reference to the accompanying drawings.

A method of and apparatus for regenerating an adsorbent according to a first embodiment of the present invention will be described below.

The method of regenerating an adsorbent according to the present invention includes applying a voltage between an electrode formed of a used adsorbent and an opposite electrode, both being arranged in an electrolyte, to cause an oxidation reduction reaction, thereby dissociating an ionized adsorbed substance in the electrolyte.

Examples of the adsorbed substance may include heavy metals such as mercury (Hg) and selenium (Se), which are contained in exhaust gas in large amounts. Besides these, trace metals may be treated.

For example, in the case of Hg, $[HgCl_4]^{2-}$ or $Hg_2^{2+}$ ions are dissociated into an electrolyte by electrolysis and then precipitated in a precipitation device, thereby desorbing and separating mercury. When the voltage is applied, anode/cathode polarization sweeping may be repeated.

In the case of selenium (Se), $SeO_3^{2-}$ ions are dissociated into an electrolyte by electrolysis and then precipitated and separated in a precipitation device as a metal.

Figure 14A:
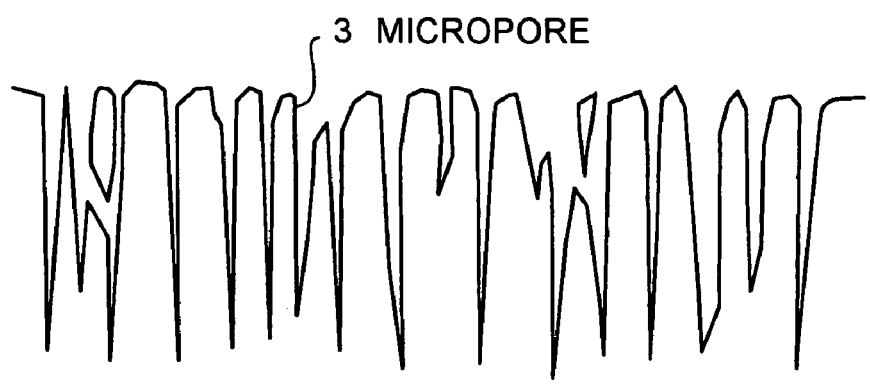
FIGS. 14A and 14B are structural views of a carbon material.
Figure 14B:
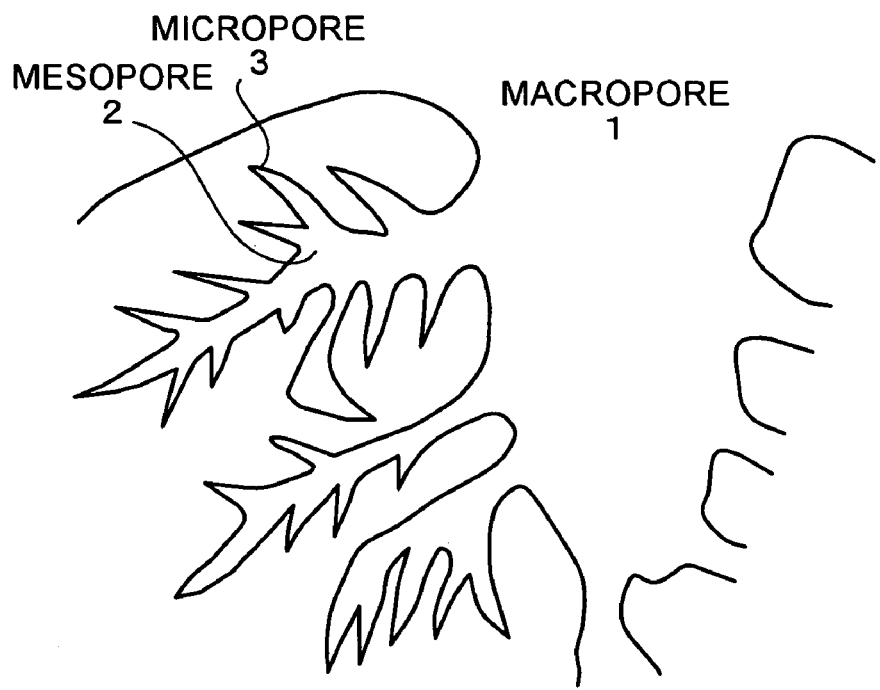

Besides heavy metals, fluorine (F) adsorbed onto an adsorbent may be dissociated as $F^-$ ions in an electrolyte. Various types of adsorbents may be regenerated. In particular, activated carbon fiber having the inner structure shown in FIG. 14A or a carbon material such as activated charcoal having the inner structure shown in FIG. 14B may be suitably used.

A desulfurization apparatus for exhaust gas using the adsorbent to be regenerated by the present invention will be described below by way of example.

Figure 10:
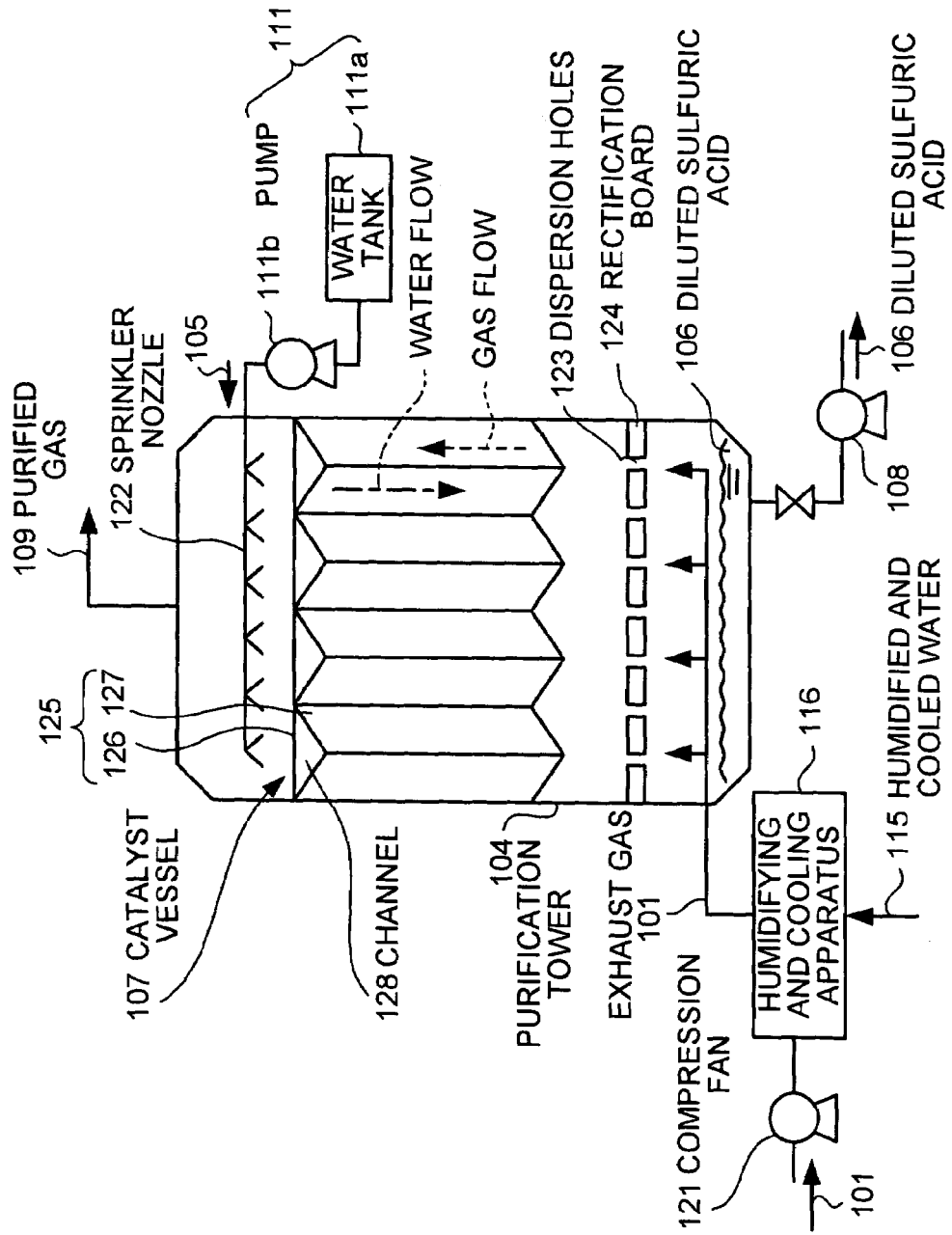
FIG. 10 is a schematic diagram of a purification tower according to an embodiment of the present invention.

FIG. 10 is a schematic diagram of a desulfurization apparatus for removing a trace amount of a sulfur oxide from exhaust gas. In the following embodiments, activated carbon fiber is used as the carbon material.

As shown in FIG. 10, exhaust gas 101 released from a boiler or the like is sent by a compression fan 121 to a humidifying and cooling apparatus 116 for cooling the temperature of the exhaust gas while imparting humidity and then introduced into a purification tower 104 through an inlet provided in the lower sidewall. The purification tower 104 houses a catalyst vessel 107 formed of activated carbon fiber layers. To the catalyst vessel 107, water 105 for generating sulfuric acid is supplied from a water supply apparatus 111 constituted of a water tank 111a and a supply pump 111b. In the purification tower 104, the water 105 is supplied from the water supply apparatus 111 though the upper portion and simultaneously exhaust gas 101 is supplied from the lower portion into the catalyst vessel 107. From the exhaust gas 101, a sulfur oxide ($SO_x$) is reformed through a reaction and removed. Purified gas 109 passing through the catalyst vessel 107 is emitted from an exhaust port provided in the top of the purification tower 104 and released through a chimney (not shown) to the atmosphere. Note that, in FIG. 10, reference numeral 124 indicates a rectification board having dispersion holes 123 for rectifying the exhaust gas.

The catalyst vessel 107 contains a catalyst formed of a plurality of activated carbon fiber layers. On the surface of each activated carbon fiber layer, a desulphurization reaction takes place, for example, in the following steps:

adsorbing sulfur dioxide $SO_2$ in exhaust gas by the activated carbon fiber layers of a catalyst;

reacting the sulfur dioxide $SO_2$ adsorbed with oxygen $O_2$ contained in exhaust gas to produce sulfur trioxide $SO_3$ ($O_2$ may be additionally supplied);

dissolving sulfur trioxide $SO_3$ in water $H_2O$ to produce sulfuric acid $H_2SO_4$; and removing sulfuric acid $H_2SO_4$ produced from the activated carbon fiber layers.

The reaction equation is as follows:

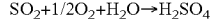

$$SO_2 + 1/2 O_2 + H_2O \rightarrow H_2SO_4$$

As shown above, sulfur dioxide ($SO_2$) in purified exhaust gas 103 is adsorbed by the activated carbon fiber layers of the catalyst vessel 107 and oxidized therein, and then reacted with water ($H_2O$) to produce sulfuric acid ($H_2SO_4$). In this way, $SO_2$ is separated and removed. In other words, desulfurization of the exhaust gas 101 is performed.

Figure 11:
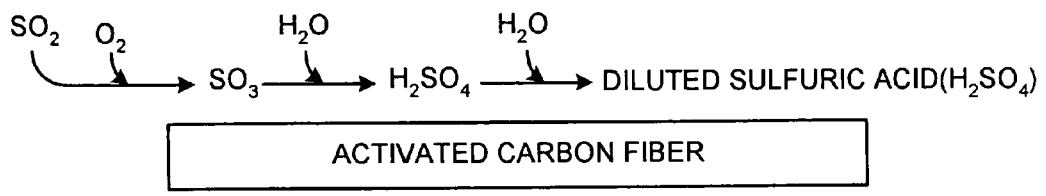
FIG. 11 is a schematic diagram illustrating a desulfurization reaction.

The desulfurization is illustrated in the schematic view of FIG. 11.

An example of the activated carbon fiber to be used in the catalyst vessel 107 and a process for producing the activated carbon fiber will be described below.

Examples of the activated carbon fiber to be used in the present invention include a pitch-based activated carbon fiber, polyacrylonitrile-based activated carbon fiber, phenol-based activated carbon fiber, and cellulose-based activated carbon fiber; however, the present invention is not limited to these. Any activated carbon fiber may be used as long as it has a catalyst function.

Figure 12:
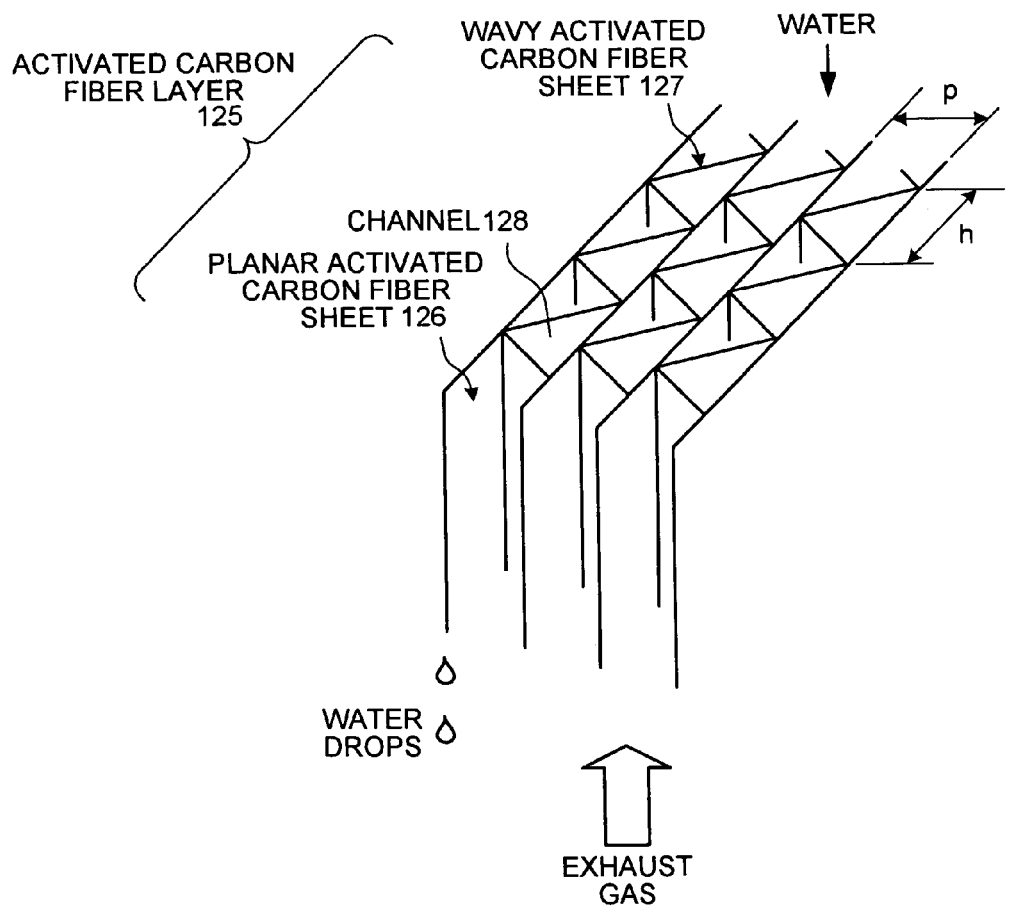
FIG. 12 is a perspective view of an activated carbon fiber layer according to an embodiment of the present invention.

FIG. 12 is a perspective view of the activated carbon fiber layer 125 to be arranged in the purification tower 104 according to an embodiment of the present invention.

As shown in FIG. 12, the activated carbon fiber layer 125 forming a unit of the catalyst vessel 107 is formed by stacking planar activated carbon fiber sheets 126 and wavy activated carbon fiber sheets 127 alternately with a linear space between them. The linear space extends vertically and is used as a channel 128. The shape of the wavy activated carbon fiber sheet 127 is formed by use of, for example, a corrugater. Besides the wavy form, the activated carbon fiber sheet may be formed into a honey comb form or a form through which exhaust gas passes in parallel to the activated carbon fiber sheet.

As shown in FIG. 10, water 105 is supplied from a sprinkler nozzle 122 like a mist while the purified exhaust gas 103 is fed from the lower side. Therefore water 105 passing through the activated carbon fiber layers 125 falls in the form of water drops having a diameter of about several millimeters.

Since the purified exhaust gas 103 passes through the channel 128, pressure loss of the gas can be suppressed.

To arrange a catalyst vessel 107 within the purification tower 104, the stacked activated carbon fiber layers 125 are placed in a framed body (not shown) to form a catalyst vessel 107 (for example, 0.5 to 4 meter height), and then the catalyst vessel 107 is arranged in the purification tower 104 by, for example, a lift.

A system of processing exhaust gas using a desulfurization unit will be described next with reference to FIG. 13.

As shown in FIG. 13, the system includes a boiler 200, which generates steam for driving a steam turbine; a dust collector 201, which removes dust of exhaust gas 101 from the boiler; a compression fan 121, which supplies the exhaust gas free from dust into a purification tower 104; a humidifying and cooling apparatus 116 which cools and humidifies the exhaust gas 101 before supplying it into the tower; a purification tower 104 having a catalyst vessel 107 arranged therein, for desulfurizing $SO_x$ in the exhaust gas to diluted sulfuric acid ($H_2SO_4$) by supplying the exhaust gas 101 from an inlet 104a of the lower sidewall of the tower, simultaneously supplying water through a sprinkler nozzle 122 from above the catalyst vessel 107; a chimney 202, which exhausts desulfurized and purified exhausted gas out of an exhaust port 104b provided in the top of the tower; a gypsum reaction vessel 212, which stores the diluted sulfuric acid ($H_2SO_4$) 106 supplied from the purification tower 104 through a pump 108 and precipitates gypsum by supplying lime slurry 211; a precipitation vessel (thickner) 213 which precipitates the gypsum; and a dewatering container 216 which removes water from gypsum slurry 214 as discharge water (filtrate) 217 to obtain gypsum 215. Note that a mist eliminator 203 may be provided in the line for exhausting purified gas 109 from the purification tower 104 to remove water from the gas.

In the boiler 200, to generate steam for driving a steam turbine (not shown) of thermoelectric power equipment, a fuel such as coal or heavy oil is burned in a furnace. The exhaust gas 101 from the boiler 200 contains sulfur oxides ($SO_x$) and therefore is desulfurized by a desulfurization device (not shown), cooled by a gas heater, and dust is removed therefrom by the dust collector 201.

In the exhaust gas purification system, the lime slurry 211 is supplied to the diluted sulfuric acid 106 obtained in the purification tower 104 to obtain the gypsum slurry 214, which is then dewatered and used as the gypsum 215. Alternatively, the diluted sulfuric acid 106 obtained by desulfurization may be used as it is.

The activated carbon fiber or activated charcoal constituting the catalyst vessel 107 used in the exhaust gas treatment system or the like adsorbs substances (adsorbed substances) such as heavy metals including mercury, selenium, and fluorine. The adsorbed substances must be efficiently desorbed from the activated carbon fiber. The desorption can be performed by a regeneration apparatus for an adsorbent of the present invention.

The activated carbon fiber layer 125 used in the adsorption treatment is molded and used as an electrode in the regeneration process mentioned above. In this way, the activated carbon fiber layer is regenerated. After removing heavy metals, the activated carbon fiber layer may be reused.

The present invention will be described below with reference to the Examples.

Figure 1:
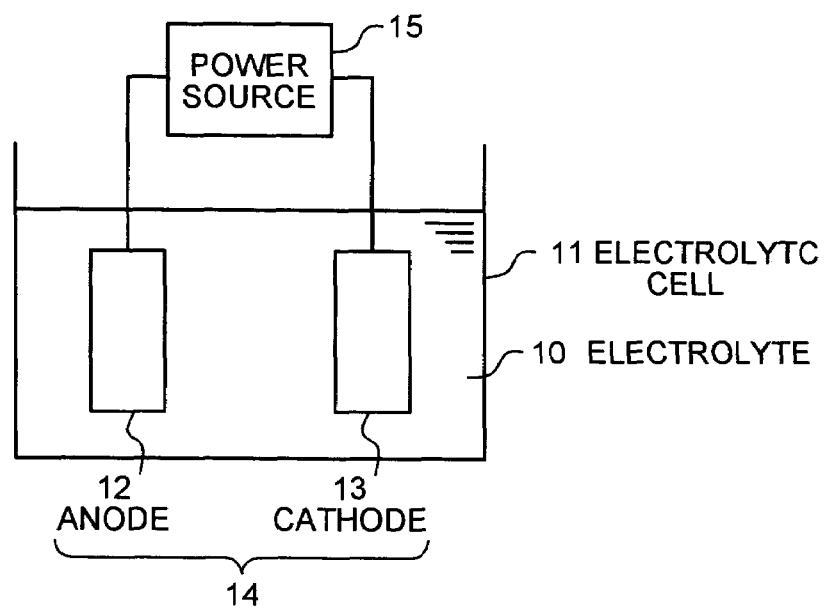
FIG. 1 is a schematic diagram of an electrolysis apparatus of Example 1.

Example 1 of the present invention will be described first. FIG. 1 illustrates a treatment apparatus according to Example 1 for eluting adsorbed substances by electrolysis. As shown in FIG. 1, the regeneration treatment apparatus according to this Example includes an electrolytic cell 11 filled with an electrolyte 10; an electrode device 14 constituted of an anode 12 soaked in the electrolyte 10 and formed of a used adsorbent, and a cathode 13 (an opposite electrode of the anode 12); and a power source 15 for applying a voltage to the electrode device 14. Note that the adsorbent may be used as either an anode or a cathode depending upon an object to be removed by electrolysis or an electrolytic method to be employed.

The following Examples will be described on the assumption that mercury is adsorbed to an adsorbent as a heavy metal.

A used adsorbent may be molded into a plate-form, comb-tooth form, or the like.

As shown in FIG. 1, the electrode device 14 includes the anode 12 formed of a used adsorbent and the cathode 13 (the opposite electrode) formed of platinum (Pt). As the electrolyte 10, sulfuric acid is used.

In this structure, when a voltage from the power source 15 is applied to the electrode device 14, an oxidation reduction reaction takes place, with the result that mercury attached to the adsorbent of the anode 12 is eluted in the electrolyte 10 as $Hg_2^{2+}$ ions.

Thereafter, an alkaline agent such as sodium hydroxide (NaOH) or potassium hydroxide (KOH) is added to the electrolyte 10, thereby increasing a mole ratio of Na or K to Hg.

After that, an oxidizing agent such as hydrogen peroxide ($H_2O_2$) or ozone ($O_3$) is added to the electrolyte 10 to obtain mercurous oxide (HgO), which is allowed to precipitate and is then recovered.

In place of the oxidizing agent, $H_2S$ may be added to precipitate HgS in order to recover mercury (Hg).

Furthermore, mercury is recovered by settling it electrochemically on the opposite electrode in place of adding a chemical agent.

Figure 2:
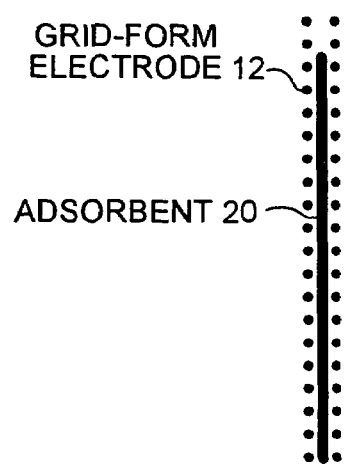
FIG. 2 is a view illustrating an adsorbent of Example 1 sandwiched by grid-form electrodes.
Figure 3:
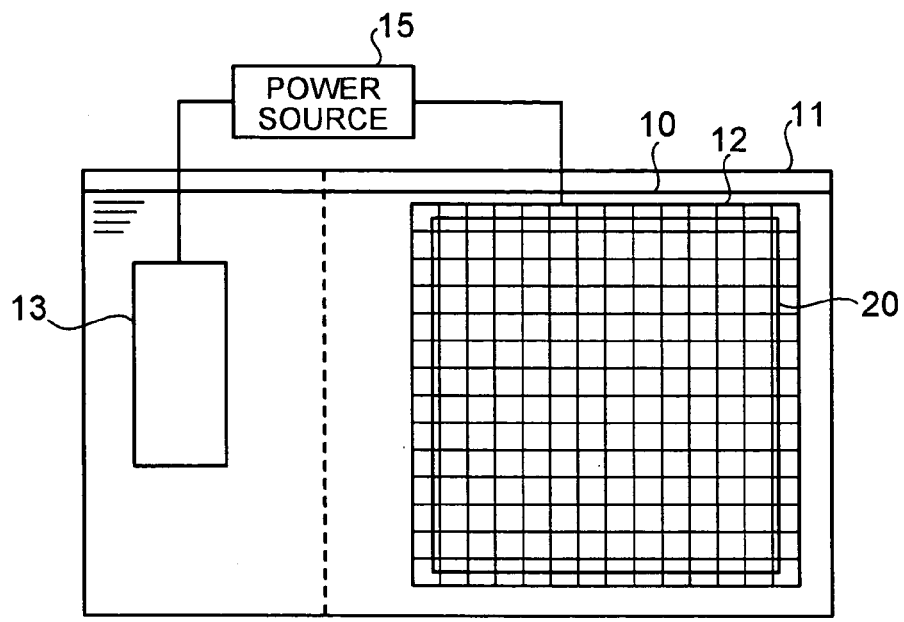
FIG. 3 is a schematic diagram of another electrolysis apparatus of Example 1.

As shown in FIG. 1, a used adsorbent mentioned above may be used as an electrode by connecting an electric wire thereto. Alternatively, as shown in FIGS. 2 and 3, a used adsorbent 20 may be sandwiched by grid-form electrodes 12. When the grid-form electrodes 12 are used, a potential can be applied uniformly to the entire adsorbent, thereby increasing a precipitation efficiency of mercury.

Figure 4:
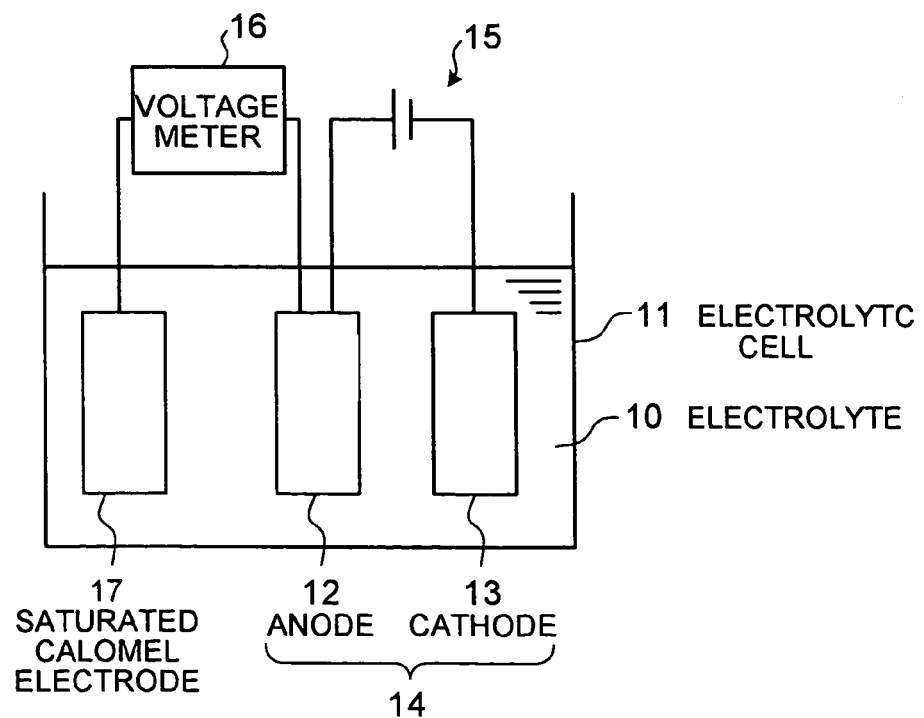
FIG. 4 is a schematic diagram of an electrolysis apparatus of Example 2.

Example 2 will be described next. FIG. 4 illustrates a processing apparatus for eluting an adsorbed substance by electrolysis according to Example 2. As shown in FIG. 4, an electrode device 14 including an electrolytic cell 11 filled with an electrolyte 10, an anode 12 formed of a used adsorbent and soaked in the electrolyte 10, and a cathode 13 (the opposite electrode); a power source 15 for applying a voltage to the electrode device 14, and a saturated calomel electrode 17 serving as a reference electrode; and a voltage meter 16 for measuring the potential between the cathode 12 and the electrode 17.

In this Example, the electrode formed of a used adsorbent is employed as the anode 12, platinum (Pt) is used as the cathode 13 which is the opposite electrode of the anode 12, and sodium chloride is used as the electrolyte 10. Besides sodium chloride, for example, potassium chloride or sodium carbonate may be used as the electrolyte 10.

In the structure mentioned above, mercury is eluted in the electrolyte 10 as Hg ions ($Hg_2^{2+}$) through an oxidization-reduction reaction by applying a voltage from a power source 15 to the electrode device 14. Then, the voltage of the power source is varied to perform anode/cathode polarization sweeping (+1 V to −1 V).

Figure 5A:
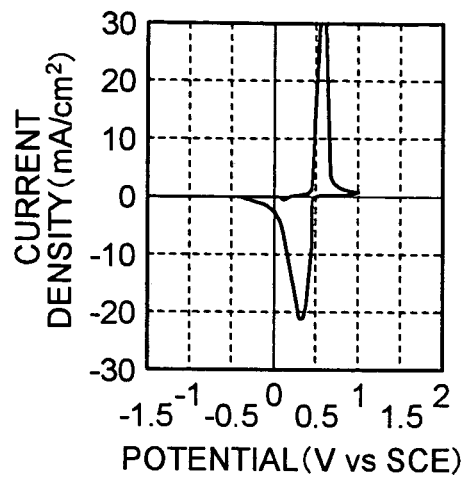
FIGS. 5A to 5C are graphs illustrating adsorption and desorption of mercury by electrolysis.
Figure 5B:
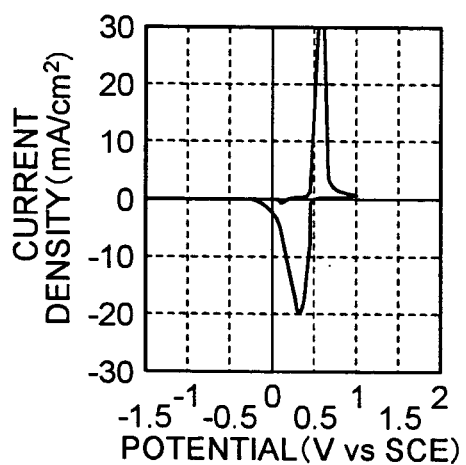
Figure 5C:
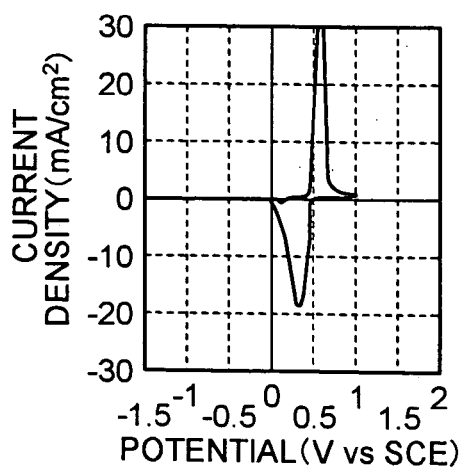

When the anode/cathode polarization sweeping is performed, the process in which mercury adsorbed to the adsorbent is eluted into the electrolyte and again precipitated onto the adsorbent is repeated. This repeat operation is shown in FIGS. 5A to 5C. More specifically, FIGS. 5A, 5B, and 5C show first, second, and third repeats, respectively. As shown FIGS. 5A to 5C, with an increase of operation times, the precipitation amount of mercury gradually decreases and mercury is increasingly eluted in the electrolyte.

As shown in FIGS. 5A to 5C, when the voltage is 0.5 V or more, a current density is increased (a positive value goes up) by an oxidation reaction of mercury described below, with the result that mercury is eluted as Hg ions. On the other hand, when the voltage is 0.5 V or less, the current density decreases (a negative value goes up) by the precipitation reaction of mercury described below, with the result that mercury is adsorbed onto an electrode. When the adsorption and desorption is repeated as described above, the dissolution ratio of mercury into the electrolyte is gradually increased, with the result that Hg is desorbed from the adsorbent.

Oxidation reaction of mercury

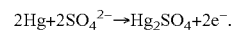

$$2Hg + 2SO_4^{2-} \rightarrow Hg_2SO_4 + 2e^-.$$

Precipitation reaction of mercury

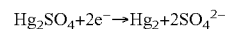

$$Hg_2SO_4 + 2e^- \rightarrow Hg_2 + 2SO_4^{2-}$$

A single cycle of elution may range from several minutes to several days or one week.

Thereafter, an alkaline agent such as sodium hydroxide (NaOH) or potassium hydroxide (KOH) is added in the electrolyte 10 to increase the molar ratio of Na or K to Hg.

After that, an oxidizing agent such as hydrogen peroxide ($H_2O_2$) or ozone ($O_3$) is added to the electrolyte 10 to obtain mercurous oxide (HgO), which is allowed to precipitate and is then recovered.

Furthermore, as shown in FIGS. 5A to 5C, mercury can be selectively removed by applying a voltage from about 0.5 V to 0.8 V, and vice versa.

Example 3 will be described next. In Example 3, the electrolysis of water was performed in the same manner as in Example 2 except that a voltage of 2V or more was applied. As a result, oxygen ($O_2$) was generated, accompanied by desorbing mercury, which was an adsorbed substance to the adsorbent.

Figure 6A:
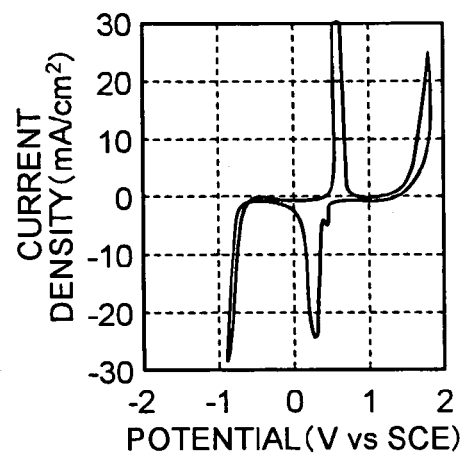
FIGS. 6A to 6C are another graphs illustrating adsorption and desorption of mercury by electrolysis.
Figure 6B:
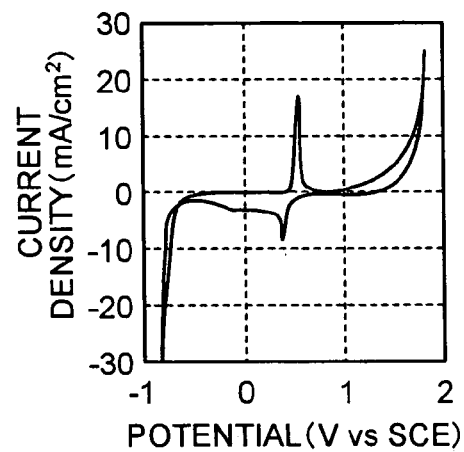
Figure 6C:
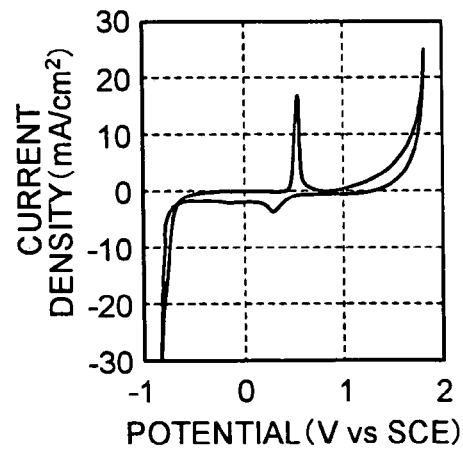

To describe more specifically, anode/cathode polarization sweeping was performed by changing the voltage (+2 V to −2 V) from the power source 15. This repeat operation is shown in FIGS. 6A to 6C. As is apparent from FIGS. 6A to 6C, with an increase of operation time, the precipitation amount of mercury gradually decreases and mercury is increasingly eluted in the electrolyte. Note that, when a negative voltage is applied, hydrogen ($H_2$) is generated.

As shown in FIGS. 6A to 6C, when the voltage is 1.5 V or more, a current density is increased (a positive value goes up), with the result that oxygen is generated. Along with the oxygen generation, a physically adsorbed substance, mercury, is pushed out and physically dissociated as mercury in the electrolyte. On the other hand, when the negative voltage is applied, hydrogen is generated. Along with the hydrogen generation, the site of the electrode adsorbing mercury becomes closer to the electrolyte. As a result, mercury cannot be adsorbed to the bottom of the adsorption site. Also in this case, mercury (a physically adsorbed substance) is pushed out by the generation of hydrogen and physically dissociated as mercury in the electrolyte.

Consequently, as the operation of anode/cathode polarization sweeping is repeated, mercury is easily pushed out as it is. As a result, mercury is desorbed from the adsorbent.

Example 4 will be described next. In Example 4, electrolysis was performed by an apparatus described in Example 1 and shown in FIG. 1 to precipitate mercury at the cathode 13.

Figure 7:
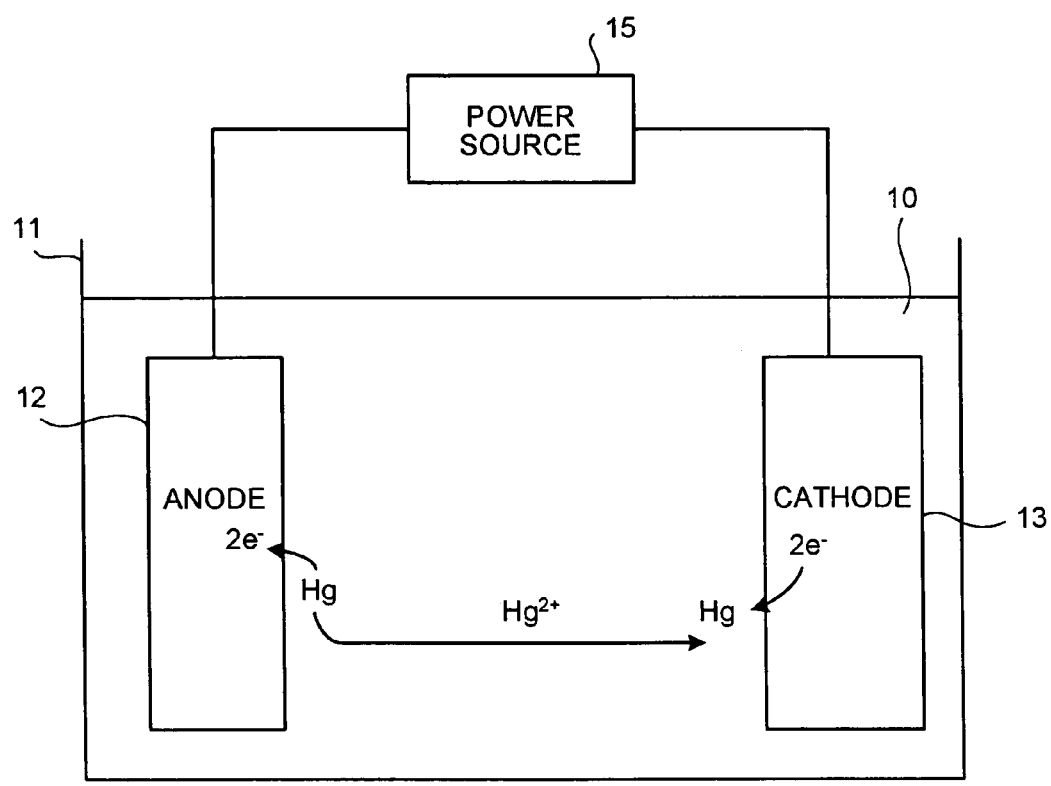
FIG. 7 is a schematic diagram of an electrolysis apparatus of Example 4.

It is found that when the potential is 0.15 V or less, mercury is precipitated at the cathode 13 (the opposite electrode). In this Example, the electrode device is constructed as shown in FIG. 7, in which the anode 12 is formed of a used adsorbent and the cathode 13 (the opposite electrode) is formed of platinum. When electrolysis is performed by applying a potential of −0.8 V or more, an inverse reaction occurs at the cathode 13 to precipitate mercury, which is separately recovered.

Example 5 will be described next. In Example 5, electrolysis was performed by using the apparatus described in Example 1 and shown in FIG. 1. In this Example, different from Example 1, the electrode device 14 was constituted of a cathode 13 formed of a used adsorbent and an anode 12 (the opposite electrode) formed of platinum (Pt). As the electrolyte 10, sodium chloride was used.

Mercury was adsorbed to the used adsorbent in advance. In the structure mentioned above, when a voltage from the power source 15 was applied to the electrode device 14 to cause an oxidation reduction reaction, an adsorbed substance, mercury (Hg), was eluted as Hg ions ($HgCl_4^{2-}$) in the electrolyte 10.

As the electrolyte 10, potassium chloride or sodium carbonate other than sodium chloride may be mentioned.

Thereafter, an oxidizing agent such as hydrogen peroxide ($H_2O_2$) or ozone ($O_3$) was added to the electrolyte 10 to obtain mercurous oxide (HgO), which is allowed to precipitate and is then recovered.

Example 6 will be described next. In Example 6, electrolysis was performed by using the apparatus described in Example 1 and shown in FIG. 1. In this Example, similarly to Example 5, an electrode device 14 was constituted of a cathode 13 formed of a used adsorbent and an anode 12 (the opposite electrode) formed of platinum (Pt). As the electrolyte 10, sodium chloride was used.

Selenium was adsorbed to the used adsorbent in advance. In the structure mentioned above, when a voltage from the power source 15 was applied to the electrode device 14 to cause an oxidation reduction reaction, an adsorbed substance, selenium (Se), was eluted as Se ions ($SeO_3^{2-}$) in the electrolyte 10.

As the electrolyte 10, potassium chloride or sodium carbonate other than sodium chloride may be mentioned.

Thereafter, a reducing agent such as $SO_2$ was added to obtain a metal Se, which is allowed to precipitate and is then recovered.

Example 7 will be described next. In Example 7, electrolysis was performed by using the apparatus explained in Example 1 and shown in FIG. 1. In this Example, similarly to Example 5, an electrode device 14 was constituted of a cathode 13 formed of a used adsorbent and the anode 12 (the opposite electrode) formed of platinum (Pt). As the electrolyte 10, sodium chloride was used.

Fluorine was adsorbed to the used adsorbent in advance. In the structure mentioned above, when a voltage from the power source 15 was applied to the electrode device 14 to cause an oxidation reduction reaction, an adsorbed substance, fluorine (F), was eluted as $F^-$ ions in the electrolyte 10.

As the electrolyte 10, potassium chloride or sodium carbonate other than sodium chloride may be mentioned. Thereafter, Li, an alkaline earth metal such as Ca, Sr, Ba, or Ra or a rare earth element (La, Y) was added to precipitate and recover a salt of fluorine.

For example, if $Ca(OH)_2$ is added, $CaF_2$ is precipitated. As the used adsorbent, a carbon material used in an exhaust gas treatment apparatus was used. However, the present invention is not limited to this and any adsorbent used in any adsorption treatment may be used.

Figure 8:
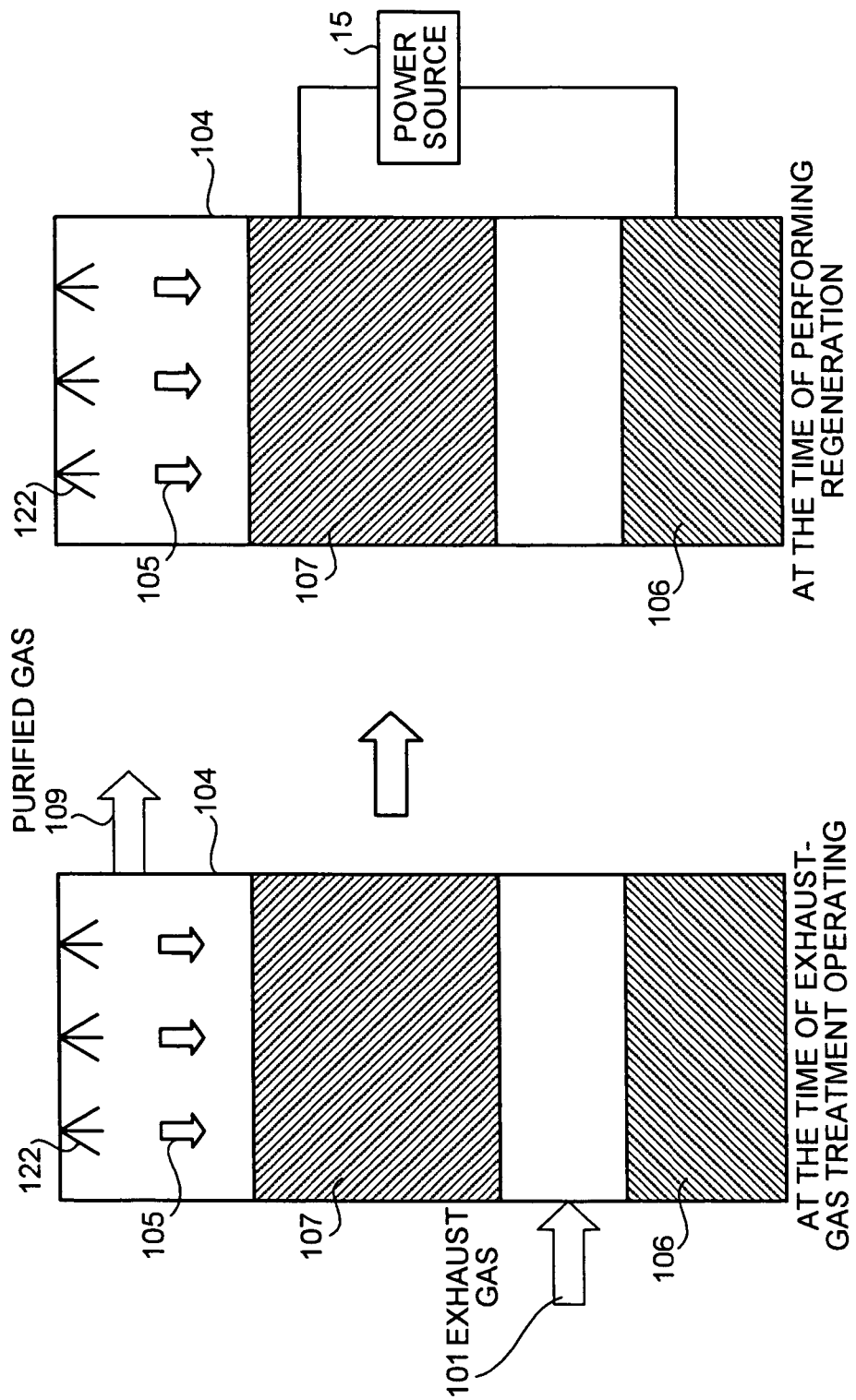
FIG. 8 is a diagram illustrating a regeneration process performed in a purification tower.

As a regeneration method for an adsorbent, a method for regenerating a used adsorbent by using it as an electrode in an electrolysis apparatus may be used as described above. Besides this, as shown in FIG. 8, a method for applying a voltage from a power source 15 by use of a wire which has been provided in the purification tower 104 serving as an exhaust gas treatment apparatus. In this case, the opposite electrode may be prepared in sulfuric acid 106 in advance.

As shown in FIG. 8, water (or sulfuric acid) is sprinkled from the sprinkler nozzle 122 to the catalyst vessel 107 serving as an adsorbent to maintain a circuit at an electrically connected state for applying a voltage.

Since heavy metals removed from the adsorbent are placed in water or sulfuric acid, they may be recovered separately and subjected to a final disposal process or recycled as resources.

Figure 9:
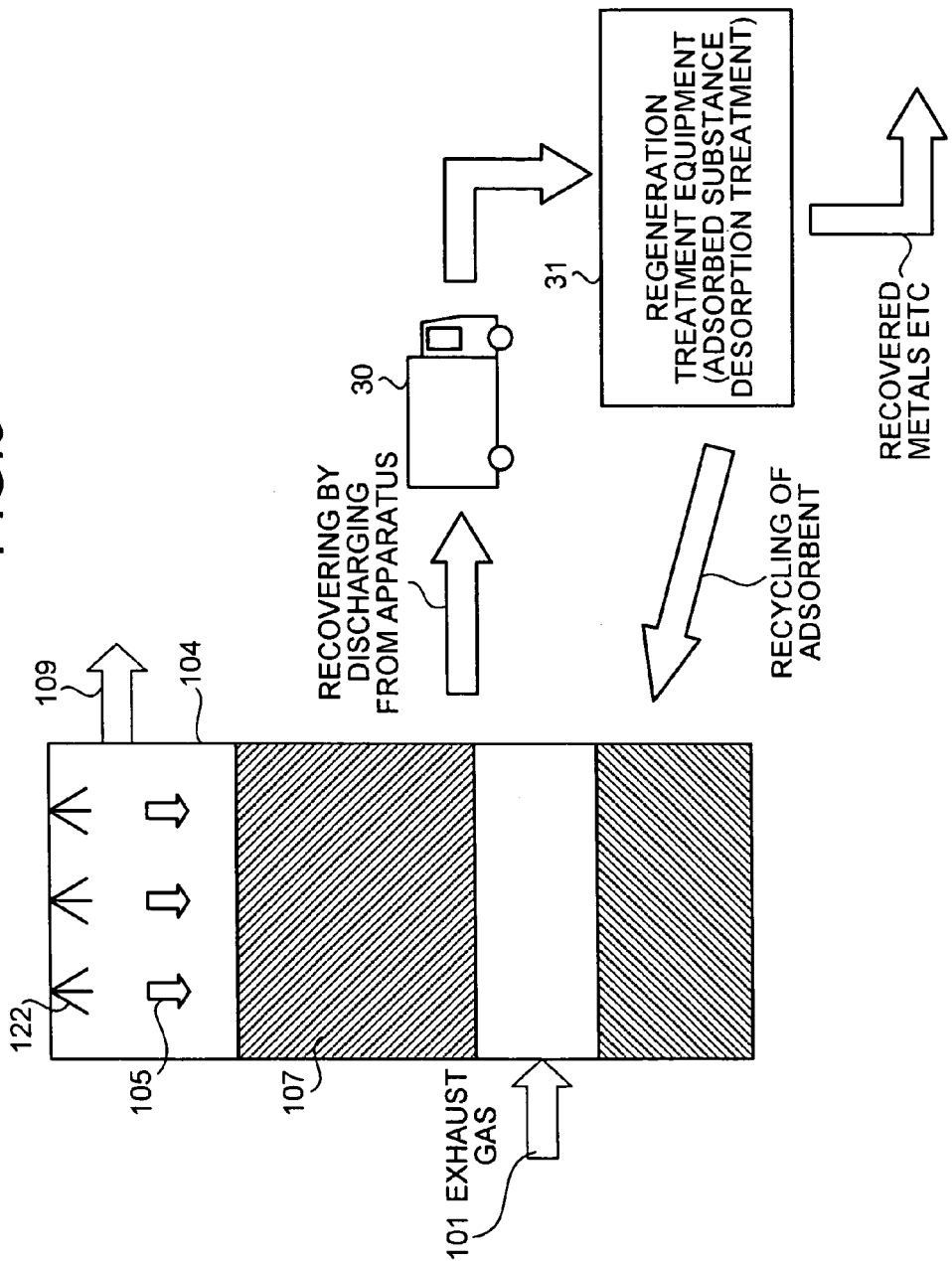
FIG. 9 is diagram illustrating another regeneration process.

There is another regeneration method. As shown in FIG. 9, the catalyst vessel 107 is taken out from the purification tower 104 serving as the exhaust-gas treatment apparatus and loaded by a transfer device 30 to regeneration treatment equipment 31 provided separately. After an adsorbed substance was removed, the catalyst vessel 107 may be returned to the purification tower 104 or the like and used again.

Note that the adsorbed substance thus removed is recovered and subjected to a final disposal process or recycled as a source.

As is explained above, according to the present invention, an adsorbed substance to a carbon material such as activated charcoal or activated carbon fiber can be efficiently removed.

Another embodiment will be described next. In this embodiment, a waste treatment apparatus for recycling a valuable material will be described.

Figure 15:
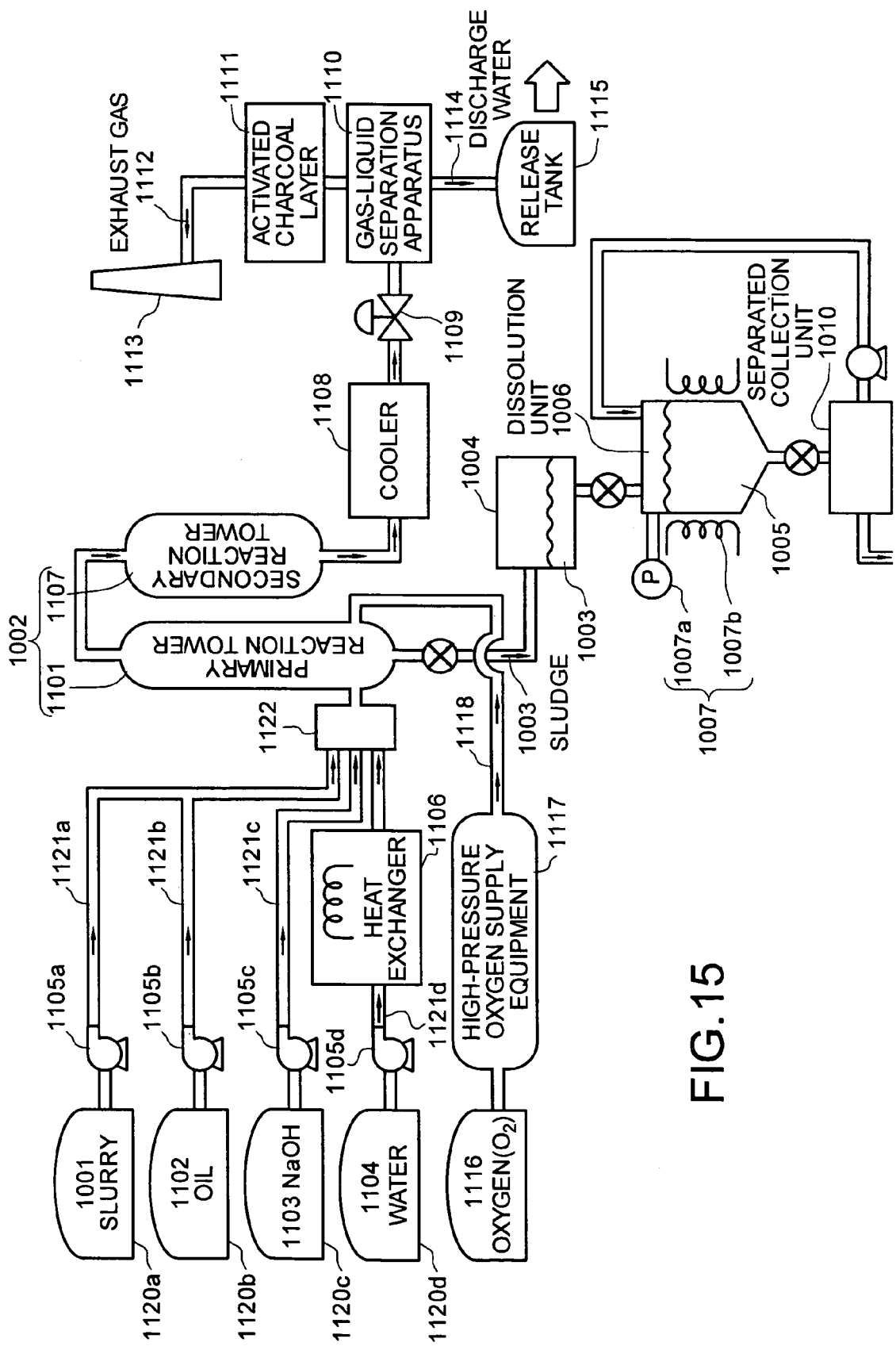
FIG. 15 is a schematic view of a waste treatment apparatus.

FIG. 15 is a schematic view of a waste treatment apparatus according to the embodiment having an aqueous thermal oxidation decomposition treatment apparatus and a sludge recovery unit.

As shown in FIG. 15, the waste treatment apparatus according to this embodiment has an aqueous thermal oxidation decomposition apparatus 1002 for performing aqueous thermal oxidation decomposition of a slurry 1001 containing a waste (carbon material) to be treated in the presence of oxygen in supercritical state or sub-critical state; a sludge recovery unit 1004 that recovers a harmful metal or a valuable metal adsorbed to the waste to be treated as a sludge 1003; a dissolution unit 1006 that dissolves the recovered sludge 1003 in a nitric acid solution 1005; and a pressure/temperature control unit 1007 that controls the pressure and temperature of the dissolution unit 1006 to be high.

The pressure/temperature control unit 1007 includes a pressurizing unit 1007a that increases the pressure of the inner atmosphere of the dissolution unit 1006 to a value as high as 25 mega pascals or more, which produces a supercritical state or sub-critical state; and a heating unit 1007b that heats the inner atmosphere of the dissolution unit 1006 to a temperature as high as 200° C. or more.

The embodiment will be described by taking activated carbon fiber as activated carbon as an example of waste to be treated. When the activated carbon fiber is used in a desulfurization apparatus, it is formed into a sheet by use of an organic binder. When the activated carbon fiber sheet is subjected to waste treatment, it is preferable that the sheet is cut into pieces, converted into slurry in order to improve flowablity, and then subjected to aqueous thermal oxidation treatment.

The aqueous thermal oxidation decomposition apparatus 1002 according to this embodiment includes a cylindrical primary reaction tower 1101, pressurizing pumps 1105a to 1105d for independently pressurizing individual treatment solutions: carbon-material slurry 1001, oil (or organic solvent) 1102, sodium hydroxide (NaOH) 1103, and water ($H_2O$) 1104; a heat exchanger 1106 for preheating the water 1104; a secondary reaction tower 1107 having a spiral tube structure; a cooler 1108; and a reducing valve 1109. Furthermore, downstream of the reducing valve 1109, a gas-liquid separation apparatus 1110 and activated charcoal vessel 1111 are arranged. Exhaust gas ($CO_2$) 1112 is released outside from a chimney 1113 and discharge water ($H_2O$, NaCl) 1114 is stored in a release tank 1115 and separately discharged as needed.

Treatment liquids, namely, the slurry 1001, oil (or organic solvent) 1102, sodium hydroxide (NaOH) 1103, and water ($H_2O$) 1104, are introduced into the primary reaction tower from treatment liquid tanks 1120a to 1120d, respectively, by way of pipes 1121a to 1121d and an ejector 1122.

Further, an oxidizing agent 1116 such as oxygen ($O_2$) is supplied by high-pressure oxygen supply equipment 1117, and an oxygen supply pipe 1118 is directly connected to the primary reaction tower 1101. Note that the oil (or an organic solvent) 1102 is used particularly to accelerate a decomposition reaction and increase the reaction temperature to the optimal temperature at the start-up time of the decomposition apparatus 1002. Furthermore, the carbon material slurry 1001, sodium hydroxide 1103, and water 1104 may be mixed and supplied to the primary reaction tower 101 as a treatment liquid.

In the above apparatus, the inner pressure of the primary reaction tower 1101 is increased to, for example, 26 mega pascals, by the pressuring pump 1105. The heat exchanger 1106 preheats water ($H_2O$) to about 300° C. In the primary reaction tower 1101, the oxygen 1116 is effused and increases its temperature to 380 to 400° C. by the heat of the reaction taking place inside the tower. By the oxidization decomposition reaction taking place within the primary reaction tower 1101 by this stage, an organic substance has been decomposed into $CO_2$ to $H_2O$. In the cooler 1108, a fluid supplied from the secondary reaction tower 1107 is cooled to a temperature of about 100° C. and reduced in pressure to atmospheric pressure by the reducing valve 1109 provided downstream. Subsequently, $CO_2$, water vapor, and treatment liquid are separated by the gas-liquid separation apparatus 1110. The $CO_2$ and water vapor are exhausted into the environment through an activated charcoal layer 1111.

The method for treating waste according to this embodiment includes an aqueous thermal oxidation decomposition step of performing aqueous thermal oxidation decomposition of a waste material to be treated by using the above apparatus in the presence of oxygen in supercritical state or sub-critical state; a sludge recovering step of recovering an inorganic material adsorbed to the waste material as a sludge; a dissolution step of adding the sludge thus recovered in a nitric acid solution to dissolve it; and a metal removing step of removing a metal by gradually increasing a temperature of the metal under high pressure conditions to crystallize the metal at a crystallization temperature intrinsic to the metal, followed by precipitating the metal as a metal oxide.

More specifically, in the aqueous thermal oxidation decomposition apparatus 1002, the activated charcoal, activated carbon fiber, and organic substance recovered are subjected to aqueous thermal oxidation decomposition performed in an aqueous solution such as an aqueous $NaCO_3$ solution in the supercritical state (or sub-critical state) while supplying oxygen. As a result, organic substances such as carbon matters and a binder are decomposed into completely harmless substances, $CO_2$ and water ($H_2O$).

On the other hand, inorganic substances such as metals adsorbed to activated charcoal cannot be decomposed by aqueous thermal oxidation decomposition. Therefore, after aeration of oxygen is stopped, they are allowed to precipitate on the bottom of the primary reaction tower 1101 as the sludge 1003, and transferred to the sludge recovery unit 1004 while maintaining its supercritical state or sub-critical state.

The inorganic substances are returned once to a normal temperature and pressure by the sludge recovery unit 1004 and then added to dissolution unit 1006 containing a nitric acid solution 1005. The pressure of the dissolution unit 1006 is set at, for example, 30 mega pascals, by the pressure increasing unit 1007a and the temperature thereof is increased to 200° C. by the heating unit 1007b. As a result, Mo and Zr are precipitated as oxides, which are transferred to a separated collection unit 1010 to be separately recovered as precipitates.

The nitric acid solution, from which the precipitate is removed, is returned again to the dissolution unit 1006 and heated to increase the temperature to 250° C. by the heating unit 1007b. As a result, for example, Fe is precipitated as an oxide, which is then transferred to the separated collection unit 1010 to recover a precipitate separately.

The nitric acid solution, from which the precipitate is removed, is returned again to the dissolution unit 1006 and heated to increase the temperature to 275° C. by the heating unit 1007*b*. As a result, for example, Cr is precipitated as an oxide, which is then transferred to the separated collection unit 1010 to recover a precipitate separately.

The nitric acid solution, from which the precipitate is removed, is returned again to the dissolution unit 1006 and heated to increase the temperature to 350° C. by the heating unit 1007*b*. As a result, for example, Pd is precipitated as an oxide, which is then transferred to the separated collection unit 1010 to recover a precipitate separately.

In this way, valuable substances such as Pd and Zr are successfully recovered from the sludge 1003. Since harmful substances such as Hg and Se are present in the nitric acid solution, they are recovered as sludge by evaporating the nitric acid solution.

As a result, organic substances can be decomposed into carbon dioxide and water by the aqueous thermal oxidation decomposition apparatus. Also, inorganic substances (other than the organic substances) are not discarded as sludge. From the sludge, valuable metals are recovered and can be reused. This process differs from simple combustion, and mercury is not discharged outside as it is.

In the present invention, activated charcoal and activated carbon fiber are mentioned as wastes to be treated. However, the present invention is not limited to these. Use may be made of a wiping waste (used for wiping materials in electronic part printing step) having precious-metals such as Au, Ag, Pt, and Pd attached thereto, an RO film (used in a sea-water desalinization apparatus) having substances such as Co, Fe, Ca, and Mg attached thereto, ion exchange resin having a metal such as Au, Ag and Pd attached thereto, chelate resin having a substance such as U and Co attached thereto, and dust-collecting textile such as a bag filter.

Another embodiment will be described. In the above embodiment, sludge 13 is dissolved in an aqueous nitric acid solution and gradually heated in a supercritical state or sub-critical state. Another method may be employed. That is, the temperature of the sludge is increased at one time to a high temperature, for example, 360° C. or more, to allow all metals to precipitate as oxides. Thereafter, the temperature is reduced to a predetermined value to allow metals to precipitate at the temperature.

To describe more specifically, a method for treating waste according to this embodiment includes an aqueous thermal oxidation decomposition step of performing aqueous thermal oxidation decomposition of a carbon material in the presence of oxygen in the supercritical state or sub-critical state; a sludge recovering step of recovering a harmful metal or a valuable metal adsorbed to the waste; a first dissolution step of adding the sludge thus recovered in a nitric acid solution to dissolve it; a first metal removing step of removing metals such as Zr, Mo, Fe, Cr, and Pd as first precipitating metal oxides by increasing the temperature to 360° C. under high pressure conditions of 30 mega pascals; a second dissolution step of adding the first precipitating metal oxide in a nitric acid solution to dissolve it; a second metal removing step of removing metals such as Zr, Mo, Fe, and Cr as second precipitating metal oxides by increasing the temperature to 280° C. under high pressure conditions of 30 mega pascals; a third dissolution step of adding the second precipitating metal oxides in a nitric acid solution to dissolve it; and a third metal removing step of removing metals such as Zr and Mo as the third metal oxides by increasing the temperature to 240° C. under high pressure conditions of 30 mega pascals.

In the method mentioned above, as shown in FIG. 15, the sludge taken out from the primary reaction tower 1101 is recovered by the sludge recovering unit 1004 and added to a nitric acid solution in the dissolution unit 1006. In this manner, the first dissolution step is performed. Subsequently, the temperature is increased to 360° C. under high pressure conditions of 30 mage pascals to precipitate Zr, Mo, Fe, Cr and Pd as first precipitating metal oxides.

The first precipitating metal oxides are then taken out and separated in the separated collection unit 1010 and again added to the nitric acid solution in the dissolution unit 1006. In this manner, the second dissolution step is performed. Then, the temperature is increased to 280° C. under high pressure conditions of 30 mega pascals to precipitate Zr, Mo, Fe, and Cr as second precipitating metal oxides.

Subsequently, the second precipitating metal oxides are taken out and separated in the separated collection unit 1010 and again added to the nitric acid solution in the dissolution unit 1006. In this manner, the third dissolution step is performed. Then, the temperature is increased to 240° C. under high temperature conditions of 30 mega pascals to precipitate Zr and Mo as the third precipitating metal oxides.

By the treatment method according to this embodiment, all possible metals such as Zr, Mo, Fe, Cr and Pd which are considered to precipitate in the supercritical state of 30 mage pascals and 360° C. can be precipitated. A part of Mn, Ni, Ce, Pr, Y, Eu and Cr may sometimes be present in the solution without precipitating.

The aqueous solution from which the second precipitating metal oxides are removed is vaporized or increased to 360° C. or more to precipitate Pd, thereby recovering Pd present in the nitric acid solution.

The aqueous solution from which the third precipitating metal oxides are removed is vaporized or increased to 280° C. or more to precipitate Fe and Cr, thereby recovering Fe and Cr present in the nitric acid solution.

By this method, it is possible to efficiently separate desired valuable metals.

Figure 16:
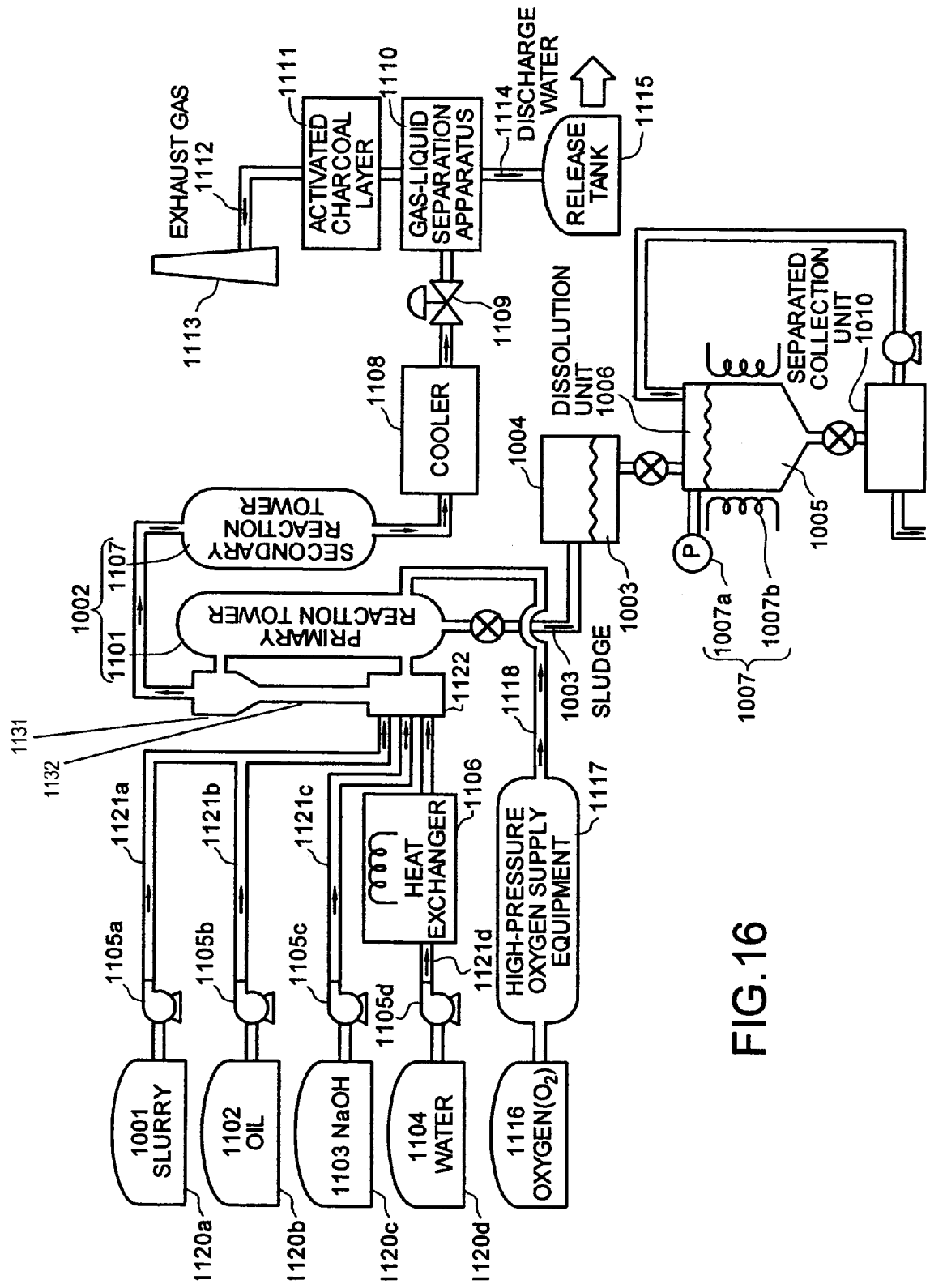
FIG. 16 is a schematic view of another waste treatment apparatus.

Furthermore, as shown in FIG. 16, to improve the recovery ratio of a metal adsorbed to an organic substance, a cyclone 1131 may be provided to prevent fine particles of the sludge 1003 from migrating to the secondary reaction tower 1107. More specifically, the fine particles of sludge 1003 may be subjected again to the reaction in the primary reaction tower 1101 by returning them to an ejector 1122 through a pipe 1132 from the cyclone 1131.

As described above, according to the embodiment, the method for the present invention includes an aqueous thermal oxidation decomposition step of performing aqueous thermal oxidation decomposition of a material to be treated (carbon material) in the presence of oxygen in a super critical state or sub-critical state; a sludge recovery step of recovering a harmful metal and a valuable metal adsorbed to the material to be treated as a sludge; a dissolution step of dissolving the sludge thus recovered in a nitric acid solution; and a metal removing step of gradually increasing the temperature under high pressure conditions to recrystallize metals, thereby removing metals as a metal oxide. Therefore, it is possible to recover valuable metals and maintain harmful metals such as Hg in the sludge without discharging them outside.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of regenerating an activated carbon fiber having mercury adsorbed thereon, comprising applying a voltage between a first electrode made from used activated carbon fiber in which mercury is adsorbed and a second electrode, acting as a counter electrode to the first electrode, so as to elute the mercury from the first electrode in an ionic state, in an electrolyte, wherein said first electrode is used as an anode, and wherein the electrolyte is sulfuric acid.

2. A method of regenerating an activated carbon fiber having mercury adsorbed thereon, comprising applying a voltage between a first electrode made from used activated carbon fiber in which mercury is adsorbed and a second electrode, acting as a counter electrode to the first electrode, so as to elute the mercury from the first electrode in an ionic state, in an electrolyte, wherein the electrolyte is sulfuric acid.

3. A method of regenerating an activated carbon fiber having mercury adsorbed thereon, comprising applying a voltage between a first electrode made from used activated carbon fiber in which mercury is adsorbed and a second electrode, acting as a counter electrode to the first electrode, so as to elute the mercury from the first electrode in an ionic state, in an electrolyte, wherein said applying comprises sweeping the voltage in a range from a positive voltage to a negative voltage, and wherein the electrolyte is sulfuric acid.

4. A method of regenerating an activated carbon fiber having mercury adsorbed thereon, comprising applying a voltage between a first electrode made from used activated carbon fiber in which mercury is adsorbed and a second electrode, acting as a counter electrode to the first electrode, so as to elute the mercury from the first electrode in an ionic state, in an electrolyte, wherein the mercury desorbed from the used activated carbon fiber is precipitated by an inverse reaction on said second electrode so as to recover the mercury.

* * * * *